Jan. 8, 1952     G. WINEINGER     2,582,090
FISHING HOOK GUARD
Filed Aug. 7, 1946
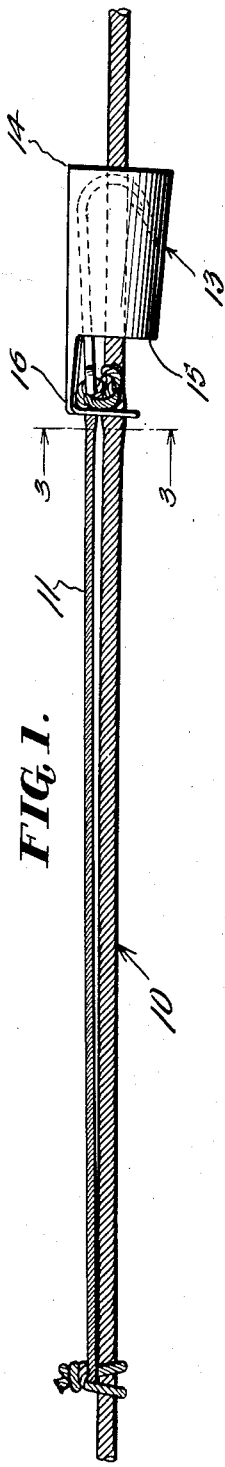
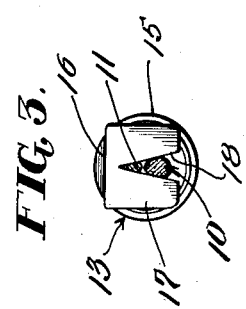
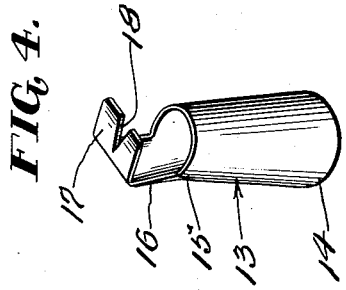
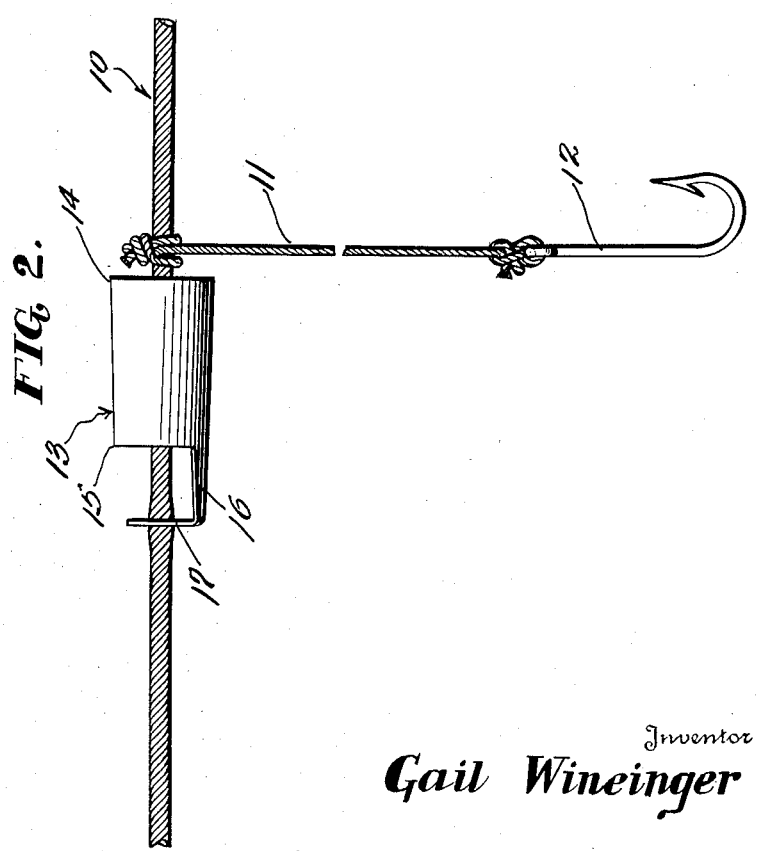
Inventor
*Gail Wineinger*
By *Wilfred E. Lawson*
Attorney Patented Jan. 8, 1952

2,582,090

UNITED STATES PATENT OFFICE 2,582,090

FISHING HOOK GUARD

Gail Wineinger, Hewins, Kans.

Application August 7, 1946, Serial No. 688,933

4 Claims. (Cl. 43—54.5)

1

This invention relates generally to the class of fishing devices and pertains particularly to guards or protective devices designed to be used in association with fish hooks.

A principal object of the present invention is to provide a protector or guard device for use on a trot-line whereby the fish hook attached to the trot-line may be readily covered and shielded to protect the fisherman during the handling of the line either while the line is being taken in for storage or being put out or set.

Another object of the invention is to provide a device of the character stated which is of relatively simple design and may therefore be inexpensively manufactured and sold in quantities.

A further object of the invention is to provide a protective or guard device of the character stated which is designed in such a manner that after it has been shifted on the trot-line to a position where it covers and shields a hook, it may be easily and quickly attached to the hook leader so as to be permanently maintained in hook covering or shielding position.

Other objects and advantages of the invention will become apparent as the description of the same proceeds and the invention will be best understood from a consideration of the following detailed description taken in connection with the accompanying drawing forming a part of the specification, with the understanding, however, that the invention is not confined to a strict conformity with the showing of the drawing but may be changed or modified so long as such changes or modifications mark no material departure from the salient features of the invention as expressed in the appended claims.

In the drawing:

Figure 1 is a view in elevation of a portion of a trot line showing a hook and leader connected thereto and showing the guard secured to the line and leader in shielding relation to the hook.

Figure 2 shows how the guard is secured to the trot line only when the hook and leader are released for use.

Figure 3 is a section on the line 3—3 of Figure 1.

Figure 4 is a view in perspective of the guard alone.

Referring now more particularly to the drawing the device embodying the present invention is shown in Figure 1, in hook covering or guarding position, which position it occupies during such time as the trot-line is stored away. In this view and in Figure 2 a portion of a trot-line is shown and generally designated 10 and to such line is attached an end of a leader 11, to the free end of which is secured the hook 12.

2

In accordance with the present invention the hook protector or guard comprises a hollow body which is preferably slightly conical and which is generally designated 13. This body is preferably of circular cross section and is of substantial length and, as stated, is slightly conical or tapered from one end to the other.

The larger end of the hollow, tubular body is designated 14 while the smaller end is designated 15 and, as shown, the smaller end has extending therefrom as an integral continuation of the wall of the body, a hood-like portion 16 which at its free or outer end has the angularly directed terminal portion 17 which is spaced from and extends across the adjacent end of the body 13 as shown in Figure 4. This angular extension or peak of the hood-like portion 16 has a V-notch 18 cut in the free edge thereof, thereby forming a claw which is designed to tightly frictionally receive and hold the hook leader 11 and the trot line 10, as shown in Figure 1, when the shield or protective body is in hook enclosing position.

As illustrated in Figures 1 and 2 the trot-line 10 extends through the body 13 and such body remains on the trot-line at all times. It will, of course, be understood that there will be one of these protective devices for each hook which is attached to the trot-line and when the trot-line is not in use, each of the protective devices will be slid along the trot-line over the leader 11, until the hook of the leader is drawn into the larger end of the protective device in the manner shown in Figure 1. When the hook point is fully within the body 13 the leader is first tightly wedged into the notch 18 and then the trot-line is wedged in, as shown in Figure 3, and thus the body 13 will maintain its shielding position with respect to the hook and the trot-line. When all of the hooks are so covered the trot-line may then be freely handled without danger of having one of the hook points catch in the hands, in the clothing or in some other object.

When the trot-line is to be set out, the protective devices will be disengaged from the line and leaders and slid back along the trot-line so that when the hook hangs from the trot-line in the manner shown in Figure 2, the protective device will be in the inoperative position in which it is shown in this view. Each device 10 is then secured in place adjacent to the attached leader by wedging the trot-line in the notch 18, so that the device is held ready for use as the line and hooks are pulled in.

From the foregoing it will be readily apparent that there is provided in the present invention a simple but efficient means for protecting both the hook and the person handling the trot-line to which the hook is attached, such means being of a character to be inexpensively produced from any type of metal, from rubber or from any one of the numerous varieties of synthetic material.

I claim:

1. The combination with a fishing line having a leader carried hook connected thereto, of a relatively long hollow body open at each of its ends and having the line extending longitudinally therethrough, and means at one end and forming a part of the hollow body formed to provide a claw in which a portion of the hook leader and fishing line may be frictionally engaged.

2. A fishing hook protective device of the character described, comprising a relatively long hollow body open at both ends, the body having a longitudinal integral continuing hood-like portion at one end, said hood-like portion terminating in an angularly directed portion spaced from the adjacent end of the hollow body, said angularly directed portion having a V-notch cut therein.

3. A device of the character stated in claim 2, wherein the said body is of larger diameter at the end remote from the hood than at the hood end and is of gradually tapering form.

4. The combination with a fishing line having a leader carried hook connected thereto, of a hollow guard body slidably mounted upon and having the line extending longitudinally therethrough and adapted to be brought into encasing relation with the hook, and a line engaging element carried by and extending across one end of said hollow body and formed to receive the line and to secure the body in position on the line against movement relative to the encased hook.

GAIL WINEINGER.

REFERENCES CITED

The following references are of record in the file of this patent:

UNITED STATES PATENTS

| Number | Name | Date |
|---|---|---|
| 269,399 | Ensign | Dec. 19, 1882 |
| 617,236 | Dougherty | Jan. 3, 1899 |
| 1,365,111 | Lawrence | Jan. 11, 1921 |
| 2,095,043 | Aikins | Oct. 5, 1937 |
| 2,097,536 | Shirk | Nov. 2, 1937 |
| 2,196,620 | Atarian | Apr. 9, 1940 |